United States Patent [19]
Saito

[11] 3,758,200
[45] Sept. 11, 1973

[54] FILTER HOLDER

[75] Inventor: Yutaka Saito, Koganei-shi, Tokyo, Japan

[73] Assignee: Nippon Kogaku K.K., Tokyo, Japan

[22] Filed: Oct. 4, 1971

[21] Appl. No.: 185,952

[30] Foreign Application Priority Data
Oct. 6, 1970    Japan ....... 45/98747 (utility model)

[52] U.S. Cl. .................................. 350/318, 74/578
[51] Int. Cl. ........................................... G02b 7/00
[58] Field of Search ........................... 350/318, 257; 74/578

[56] References Cited
UNITED STATES PATENTS
| | | | |
|---|---|---|---|
| 499,312 | 6/1893 | Turner | 74/578 |
| 2,691,322 | 10/1954 | Wittel | 350/257 X |
| 2,715,854 | 8/1955 | Simmons et al. | 350/257 |
| 1,283,963 | 11/1918 | Takahashi | 350/318 X |

*Primary Examiner*—Ronald L. Wibert
*Attorney*—Fitzpatrick, Cella, Harper & Scinto

[57] ABSTRACT

A filter holder for holding a gelatin filter in front of a photographic lens consists of a filter ring having a threaded portion for attaching the lens barrel, a filter mounting device relatively rotatable with respect to the ring and spring means interposed between the filter ring and the filter mounting device. Between the spring means and the filter ring there is provided means for rotating the holder together with the ring to mount them on the lens barrel, and at the final stage against the spring action of the spring means only the filter mounting device rotates while the ring is kept stationary so as to adjust the location of the filter mounting at a position suitable for changing the filter or for phototaking. However, when the filter holder is removed from the lens barrel, said means acts to rotate the ring together with the filter mounting device so as to secure the removal of the filter holder from the lens barrel.

4 Claims, 6 Drawing Figures

FIG. 1
FIG. 2
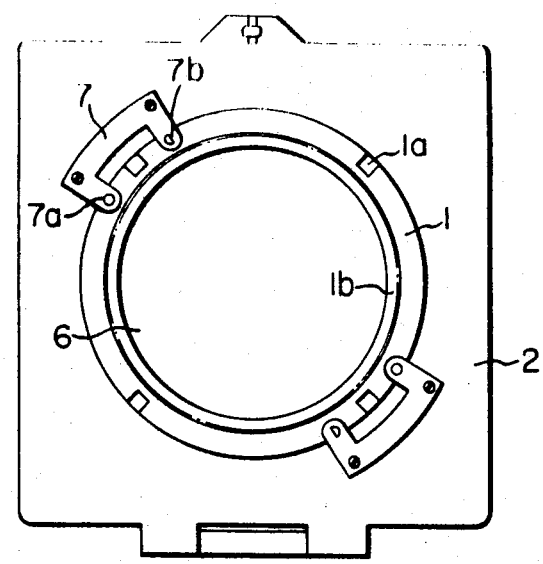
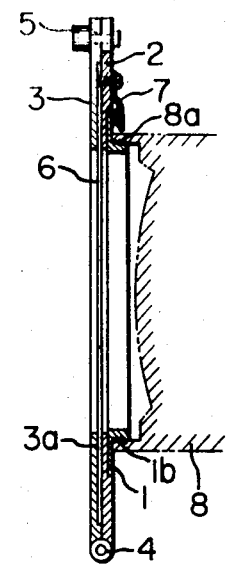
FIG. 3
FIG. 4
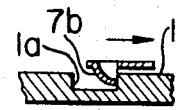
FIG. 5
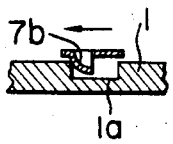
FIG. 6

FILTER HOLDER

BACKGROUND OF THE INVENTION

1. Field of the Invention

This invention relates to a filter holder, especially, a gelatin filter holder which may readily be mounted on a lens barrel and removed therefrom without damaging the lens barrel or filter.

2. Description of the Prior Art

In photography, various gelatin filters are used, but there has not been proposed a suitable filter mounting device which may conveniently be mounted and dismounted. Thus, one of the prior art filter mounting devices is arranged so that it is attached to lens barrel or the like at three angularly spaced apart positions by means of screws so that the attachment and removal of the filter mounting device or filter holder are relatively time-consuming and cumbersome operations. Furthermore, the screws tend to damage the lens barrel or the like.

SUMMARY OF THE INVENTION

It is, therefore, one of the objects of the present invention to provide a filter holder by which a gelatin filter may be mounted in a simple manner without damaging the lens barrel or the like and whose angular position may be conveniently adjusted for replacement of the filter or for other purposes in photography.

Briefly stated, a filter holder of the present invention is characterized in that a filter ring having a threaded portion for engagement with a threaded portion of a lens barrel or the like is attached to a filter mounting device for relative rotation, and leaf springs are interposed between the filter ring and the filter mounting device in such a way that the relative rotation may be permitted only in the direction in which the threaded portion of the filter ring engages with the threaded portion of the lens barrel attachment when the rotational force in excess of a predetermined magnitude is applied, but that the relative rotation may be prevented when the filter assembly is rotated in the reverse direction, wherefor the entire assembly may be removed from the lens barrel.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a bases for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification.

BRIEF DESCRIPTION OF THE DRAWING

FIG. 1 is a front elevational view of one illustrative embodiment of a filter holder in accordance with the present invention;

FIG. 2 is a longitudinal sectional view thereof;

FIG. 3 is an enlarged detail view illustrating a portion of a leaf spring;

FIG. 4 is a fragmentary sectional view illustrating the function of the quarter-sphere-like projection when the filter holder is dismounted;

FIG. 5 is a view similar to FIG. 4 illustrating the function of the quarter-sphere-like projection when the filter holder is mounted; and FIG. 6 is a view also similar to FIG. 4 illustrating the function of the quarter-sphere-like projection when the angular position of a filter mounting device of the filter holder is adjusted.

DESCRIPTION OF THE PREFERRED EMBODIMENT

The present invention will become more apparent from the following description of one illustrative embodiment thereof taken in conjunction with the accompanying drawing. Referring to FIGS. 1 and 2, a filter mounting ring 1 is provided with notches 1a and is externally threaded at 1b for engagement with internal threads 8a at the front periphery of a lens barrel 8. A filter mounting plate 2 serves to mount the filter ring 1 in cooperation with leaf springs 7, to be described in more detail hereinafter, and is rotatable relative to the filter ring 1. A filter press or holding plate 3 has a recess 3a into which is placed a gelatin filter 6, and one side edge of the plate 3 is hinged to the filter mounting or holding plate 2 by means of a hinge 4 in such a way that the filter press plate 3 may be laid over and moved away from the filter mounting or holding plate 2. A locking member 5 serves to hold the filter press plate 3 in position, as shown in FIG. 2. A filter mounting device in accordance with the present invention is constituted by the filter mounting or holding plate 2, the filter press plate 3, the hinge 4 and the locking member 5, in order to mount the gelatin filter 6.

Each leaf spring 7 is fixed to the filter mounting or holding plate 2 and serves to exert pressure on the filter ring 1 so as to hold it in position relative to the filter mounting or holding plate 2; and each has a semi-spherical projection 7a and a quarter-sphere-like projection 7b, both of which may engage the notches 1a of the filter ring 1. That is, when the rotational force is applied to the filter mounting device in the direction of screwing the filter ring 1 into the lens barrel 8, after the filter ring 1 has been completely screwed into the lens barrel 8, the filter mounting device may rotate further. However, when the filter mounting device is rotated in the reverse direction, the quarter-sphere-like projections 7b enter the notches 1a of the filter ring 1 as shown in FIG. 4, the flat sides thereof engaging the sidewall of the notches so that the further rotation of the filter mounting device relative to the filter ring 1 is prevented.

A filter holder in accordance with the present invention is constituted by the filter ring 1, the filter mounting device 2-5 and the leaf springs 7.

When the filter mounting device 2-5 is rotated in the direction indicated by an arrow in FIG. 5 to mount the filter holder to the lens barrel 8, the semi-spherical projections 7a or the quarter-sphere-like projections 7b of the leaf springs 7 may be brought into engagement with the notches 1a of the filter ring 1, as shown in FIG. 5, so that the rotation of the filter mounting device 2-7 is transmitted to the filter mounting ring by means of engagement of the projection 7a or 7b with the notches 1a. Therefore all of the parts of the filter holder 1-7 may rotate in unison until the filter ring 1 is completely screwed into the lens barrel, after which additional rotational force may be applied to the filter mounting device so that the projections 7a and/or 7b may be moved out of the notches 1a against the force of the leaf springs 7 and may ride over the filter ring 1, as shown in FIG. 6, whereby the filter mounting device 2-5 may rotate relative to the filter ring 1. Therefore, the filter mounting device 2-5 may be set in a desired angular position for replacement of the filter 6 or for other purposes of photographic operation.

When the filter mounting device 2-5 is rotated in the direction indicated by the arrow in FIG. 4 to remove the filter holder 1-7 from the lens barrel, the quarter-sphere-like projections 7b of the leaf springs 7 are brought into engagement with the notches 1a of the filter ring 1, by means of the force of the leaf spring 7 as shown in FIG. 4, and then the entire assembly may be unscrewed from the lens barrel 8; that is, all parts 1-7 of the filter holder may rotate in unison and may be removed from the lens barrel 8.

In the instant embodiment, the notches 1a have been described as being formed in the filter ring 1 and the projections 7a and 7b have been described as being formed on the leaf springs 7, but it is seen that this arrangement may be reversed. It is, of course, understood that the filter mounting device of the present invention may be also slotted to permit inserting the filter without opening the hinged plates.

From the foregoing description, it is seen that the filter holder of the present invention may be mounted in a simple manner and the angular position of the filter mounting device may be conveniently adjusted for replacement of the filters or for other purposes of photographic operation. Furthermore, the filter holder may be removed or dismounted from the lens barrel, or lens barrel attachement, in a positive convenient manner.

I claim:

1. A filter holder for attaching a filter to a lens barrel, comprising
    a member having a threaded portion for threading engagement with a threaded portion of said lens barrel:
    means having a portion for receiving said filter: and a transmission mechanism interposed between said member and said means for selectively transmitting rotation of said means to said member to threadingly engage said member with said lens barrel, said transmission mechanism being arranged to frictionally transmit the rotation in one direction of said means which causes the threading engagement of said member with said lens barrel to said member until said threading engagement is completed, to prevent said transmission after completion of said engagement to thereby permit said means to rotate relative to said member, and to lock said member and said means to positively transmit the reverse rotation of said means which causes disengagement of said member from said barrel.

2. A filter holder according to claim 1, wherein said transmission mechanism includes notches provided on one of said means and said member, a projection provided on the other one of said means and said member, and biasing means for biasing said projection to engage one of said notches.

3. A filter holder according to claim 1, wherein said projection engages said notches by means of said biasing means during said transmission, and said projection is disengaged from said notches against said biasing means after completion of said engagement of said member with said lens barrel.

4. A filter holder according to claim 3, wherein said projection is in the shape of a quarter-sphere.

* * * * *